UNITED STATES PATENT OFFICE.

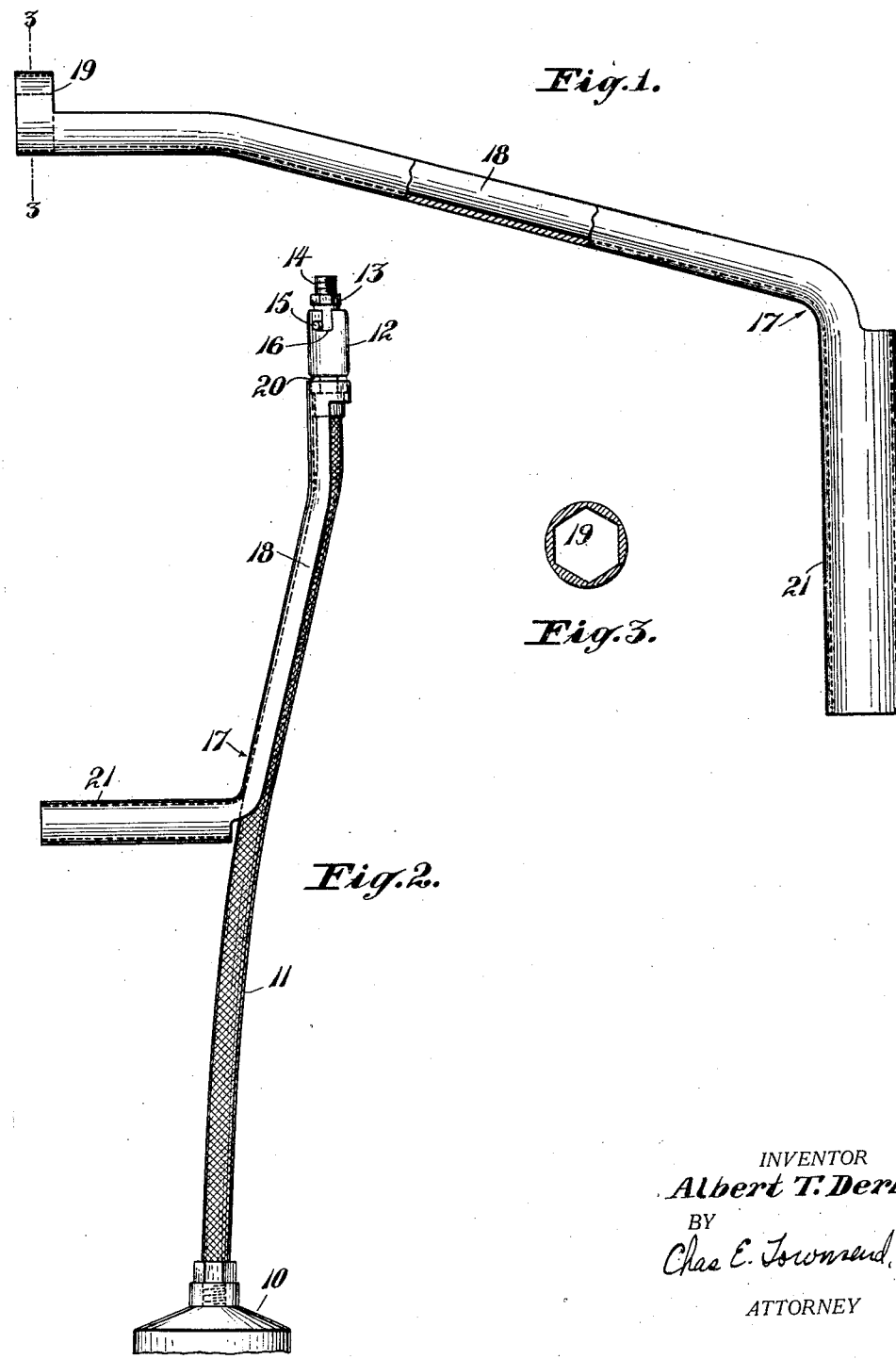

ALBERT T. DERBY, OF SAN FRANCISCO, CALIFORNIA.

GREASE-GUN WRENCH.

1,404,434.  Specification of Letters Patent.  Patented Jan. 24, 1922.

Application filed June 2, 1920. Serial No. 385,947.

*To all whom it may concern:*

Be it known that I, ALBERT T. DERBY, a citizen of the United States, residing at city and county of San Francisco and State of California, have invented a new and useful Improvement in Grease-Gun Wrenches, of which the following is a specification.

This invention relates to an attachment for a grease gun.

At the present time many makes of automobiles are equipped with an oiling system by which the various vital parts of the automobile mechanism may be greased by attaching a grease gun thereto and forcing oil through conduits to the bearing surfaces. As now designed the points of connection between the grease gun and the oiling system are in many cases inaccessible and it is the object of the present invention to provide means whereby the flexible feed hose of the grease gun may be easily connected with the oiling system and held in position while the grease is forced through the hose by the gun, after which it may be readily and conveniently disconnected.

The present invention contemplates the use of a wrench which may be attached to the nozzle end of a grease gun hose to hold the nozzle in such position as to permit the nozzle to be manipulated in a manner to interlock with the grease caps of the oiling system, said wrench being so designed as to allow the flexible hose to be easily secured to the grease caps and detached therefrom after the oiling operation has been completed.

The present invention is illustrated by way of example in the accompanying drawings, in which:

Figure 1 is a view in elevation showing the present invention with parts broken away.

Fig. 2 is a view in elevation showing the present invention as applied to the hose of the grease gun.

Fig. 3 is a view in section as seen on the line 3—3 of Fig. 1.

Referring more particularly to the drawings, 10 indicates a grease gun which is here shown as equipped with a flexible hose 11.

Secured to the end of this hose is a socket 12 adapted to receive a grease cap or nipple 13. This member has a threaded tubular shank 14 which is secured into the threaded bore of permanent grease ducts with which the automobile is supplied. As customarily made, the nipples are fitted with ball valves which will permit them to be automatically closed except under pressure of the grease forced through the hose 11 of the gun. A lock pin 15 extends from the side of the nipple and engages a bayonet slot 16 formed through the side wall of the socket 12, by means of which the socket and nipple are temporarily locked together during the greasing operation. It is to be understood that the structure described in the foregoing is a part of an oiling system now in use and that the present invention is more particularly concerned with an attachment member 17 for use therewith. This member is preferably formed from a piece of pipe, the intermediate portion of which is cut away to provide a semi-circular shank 18 into which the hose 11 may lie. The outer end of this shank portion is formed with a socket wrench 19 which will engage the nut head 20 of the socket 12 and by the aid of which the socket may be rotated in a manner to cause the pin 15 of the nipple to interlock with the bayonet slot 16 of the socket. The opposite end of the shank 18 is bent in an angle thereto to form a cylindrical handle 21 by which the tool may be grasped and manipulated. It is noted in Fig. 2 of the drawing that it is offset. This is done to permit the socket 12 of the hose to be more easily inserted in remote and inaccessible places, although it will be understood that the shank might be straight or bent at other angles if desired.

In operation of the present invention the wrench 17 is brought into engagement with the nut 20 of the socket 12 in a manner to permit the socket to be rotated thereby. In this connection it will be understood that while the wrench portion 19 is shown as completely embracing the nut 20, other forms of wrenches might be used, as, for example, a forked wrench which might accomplish substantially the same purpose. The handle 21 may then be grasped and the socket 12 disposed over the nipple 16, at the same time passing the pin 15 along the longitudinal portion of the bayonet slot 13 and thereafter rotating the socket so that the pin 15 will be locked in the end of the bayonet slot. The grease gun may then be operated to force the lubricant through the hose 11, the socket 12 and the nipple 13. After the greasing operation has been completed the socket 12 may be rotated in a reverse direction to release the pin 15, after which it may be removed.

It will thus be seen that by means of the simple and inexpensive attachment here disclosed, an oiling socket 12 may be readily and conveniently connected with and disconnected from an oiling system of the class described.

While I have show the preferred form of my invention as now known to me, it will be understood that various changes in the construction, combination, and arrangement of parts may be made by those skilled in the art without departing from the spirit of the invention as claimed.

Having thus described my invention, what I claim and desire to secure by Letters Patent, is:

1. In combination with a flexible grease gun hose, a wrench member adapted to engage the outer end thereof and to extend for a length along the hose and by which the end of the hose may be rotated and otherwise manipulated.

2. The combination with a flexible conduit, a wrench member adapted to securely engage the outer end thereof and having a shank extending a distance along the length of the hose terminating in a handle by which the wrench may be operated.

3. In combination with a flexible conduit having a rotatable socket at the end thereof, a wrench extending along the conduit and adapted to engage the socket in a manner to produce its rotation, the opposite end of said wrench being provided with a handle extending substantially at right angles to the length thereof.

4. A wrench of the character described comprising a longitudinally extending shank having semi-circular groove throughout the length thereof, a nut engaging member at one end of said shank and disposed substantially at right angles to the length thereof and a handle formed upon the opposite ends of the shank substantially at right angles thereto and upon the opposite side thereof from the nut engaging member.

5. An article of manufacture comprising a handle, a shank semi-circular in section and extending from one end of the handle and substantially at right angles thereto, a socket wrench member carried at the other end of the semi-circular shank, and through which the flexible hose of a grease gun may extend to lie along the shank.

6. An article of manufacture comprising a wrench for use with the flexible hose of a grease gun, said wrench having a socket for receiving the nut at the end of said hose, a semi-circular shank carrying the socket and disposed at right angles to the plane thereof, an offset extension formed as a continuation of said shank and along the recess of which the hose may lie, and a handle upon the opposite end of the shank from the socket member and extending in a plane parallel to the plane of the socket.

In testimony whereof I have hereunto set my hand in the presence of two subscribing witnesses.

ALBERT T. DERBY.

Witnesses:
DOROTHY G. MORSE,
DOROTHY DOYLE LUCAS.